No. 880,798. PATENTED MAR. 3, 1908.
C. JENKINS.
POTATO CUTTER AND FEEDER FOR PLANTERS.
APPLICATION FILED OCT. 26, 1907.
2 SHEETS—SHEET 1.
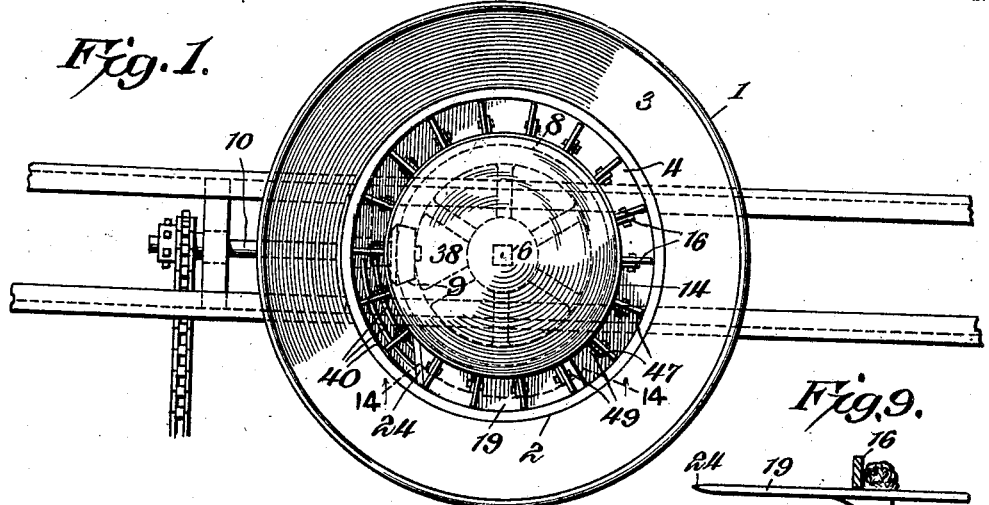
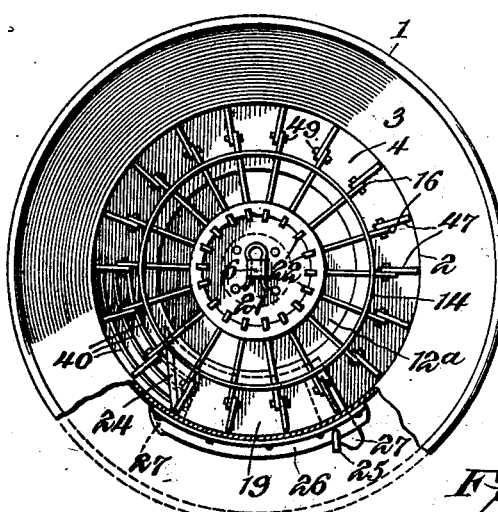
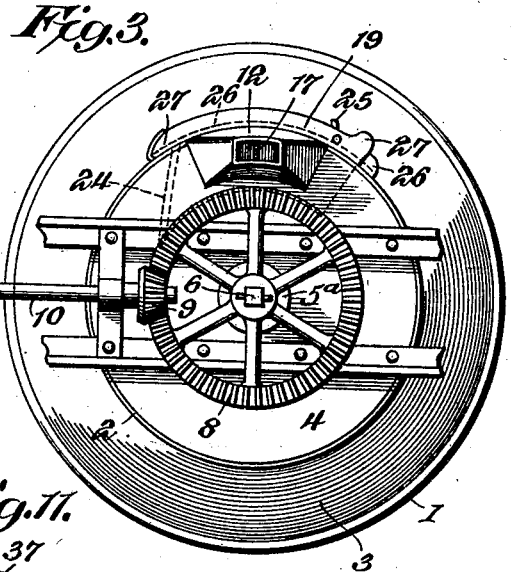
Witnesses
Howard D. Orr
H. J. Riley
Charles Jenkins, Inventor,
By C. G. Siggers
Attorney

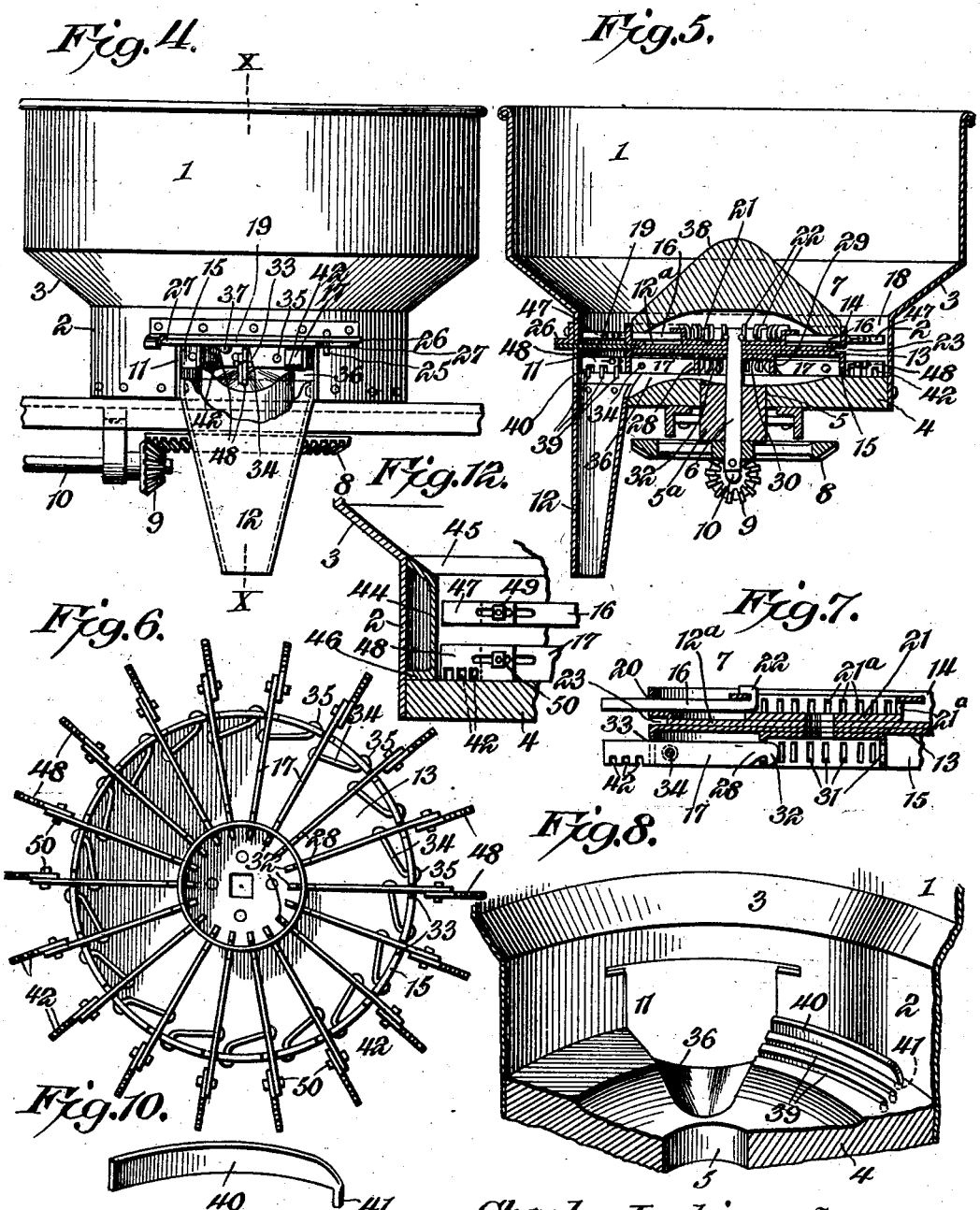

UNITED STATES PATENT OFFICE.

CHARLES JENKINS, OF DELEVAN, NEW YORK.

POTATO CUTTER AND FEEDER FOR PLANTERS.

No. 880,798.  Specification of Letters Patent.  Patented March 3, 1908.

Application filed October 26, 1907. Serial No. 399,339.

*To all whom it may concern:*

Be it known that I, CHARLES JENKINS, a citizen of the United States, residing at Delevan, in the county of Cattaraugus and State of New York, have invented a new and useful Potato Cutter and Feeder for Planters, of which the following is a specification.

The invention relates to a potato-cutter and feeder for planters.

The object of the present invention is to improve the construction of potato planters, more especially the means for feeding the potato to the seed spout, and to provide a simple and comparatively inexpensive construction adapted to simultaneously cut and feed the potatoes, and capable of adjustment to enable the potatoes to be cut into pieces of the desired size.

A further object of the invention is to provide means for positively causing the severed pieces of potatoes to fall into the seed spout.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a hopper provided with a potato cutter and feeder, constructed in accordance with this invention. Fig. 2 is a similar view, the conical top or member of the potato carrier being removed. Fig. 3 is a reverse plan view. Fig. 4 is a rear elevation, the seed spout being partly broken away to show the depression of the bottom of the hopper. Fig. 5 is a vertical sectional view on the line $x$—$x$ of Fig. 4. Fig. 6 is a reverse plan view of the potato carrier. Fig. 7 is an enlarged detail sectional view of a portion of the potato carrier, illustrating the arrangement of the upper and lower arms. Fig. 8 is a detail view of a portion of the hopper, showing the discharge opening and the depression of the bottom. Fig. 9 is an enlarged detail sectional view taken substantially on the line 14—14 of Fig. 1, illustrating the construction for positively discharging the severed portions of the potatoes from the carrier. Fig. 10 is a detail view of one of the removable plates for varying the size of the severed portions of a potato. Fig. 11 is a detail view of the knife. Fig. 12 is a detail view, illustrating the construction of the reducing sleeve or ring and the outer adjustable sections of the upper and lower arms.

Like numerals of reference designate corresponding parts in all the figures of the drawings.

1 designates a substantially cylindrical hopper, provided with a lower portion 2 of less diameter than the upper portion and connected therewith by an intermediate inclined portion 3. The hopper is also provided with a bottom 4, having a central bearing opening 5 for the reception of an enlarged bearing sleeve 5ª and a vertical shaft 6. The vertical shaft 6, which extends above and below the bottom of the hopper, is connected at its upper end with a horizontally disposed rotary potato carrier 7, and at its lower end with gearing for rotating the potato carrier. A horizontal bevel gear 8 is mounted on the lower end of the shaft 6, and meshes with a vertical bevel pinion 9 of a horizontal shaft 10. Any suitable means may be employed for communicating motion from the wheels (not shown) of the planter to the horizontal shaft. The hopper is provided at the back with a discharge opening 11, and a seed spout 12 is hung from the hopper to receive the potatoes as they fall from the rotary carrier.

The rotary carrier is provided with a body portion, consisting of upper and lower disks 12ª and 13, provided, respectively, with upwardly and downwardly extending annular rims 14 and 15 and forming supports for upper and lower radially arranged arms 16 and 17. The circular body portion of the carrier is located within the lower cylindrical portion 2 of the hopper and is spaced therefrom, and the upper and lower radially arranged arms extend outwardly from the body of the carrier and form an annular series of peripheral seed cups. The projecting portions of the arms operate in the annular spaces 18 between the body portion of the carrier and the lower portion 2 of the hopper, and they carry the potatoes into engagement with a knife 19, located in the path of the potatoes and adapted to divide the same into upper and lower portions. The upper arms 16 consist of straight pieces, extending outwardly through slots or openings 20 of the upwardly extending rim of the upper disk 12ª and secured at their inner ends to a circular plate 21. The plate 21, which is suitably secured to the upper face of the disk at the center thereof, is provided with a raised peripheral portion, having the said openings 21ᵃ and receiving the inner ends 22 of the upper arms 16. The inner ends 22 of the upper arms are substantially hook-shaped, as clearly shown in Fig. 7, but the said upper arms, which are located above the plane of the knife, may be secured to the upper disk in any other suitable manner.

The upper and lower disks 12ᵃ and 13 are spaced apart at their peripheries to provide an annular groove 23 into which the knife extends. The knife, which is arranged horizontally, is curved longitudinally and is provided with an angularly disposed cutting edge 24. It is arranged at the top of the discharge opening, and is secured by one or more fastening devices 25 to a horizontally projecting flange 26, which extends outwardly from the hopper at the top of the discharge opening. The side edges of the kinfe are curved, the inner edge being arranged within the peripheral groove of the potato carrier. The knife is provided adjacent to its outer edge with terminal projections 27, which abut against the exterior of the hopper and limit the inward movement of the knife.

The lower arms 17 of the hopper consist of plates or bars hinged at their inner ends to an inner annular flange or ring 29 of the lower disk of the potato carrier. The flange, which is preferably formed integral with a plate 30, is suitably connected with the lower disk and is provided with slots or openings 31 to receive the inner ends 32 of the arms 17. The plate 30 is suitably secured to the disk, and the inner ends 32 of the arms are substantially hook-shaped and engage the inner face of the depending ring or flange 29 and permit the arms to swing upwardly and downwardly. The outer depending rim 15 is provided with slots 33, extending upwardly from the lower edge of the rim 15. The lower arms are connected at an intermediate point with the outer rim 15 by links 34, extending inwardly from the lower rim 15 and having terminal pivots 35 at their outer ends. The terminal pivots 35 pierce the lower rim 15 and permit the links to swing upwardly and downwardly with the lower arms, which are pierced by the inner ends of the links 34. The ends of the links are also provided with suitable heads to retain them in engagement with the lower rim and with the lower arms.

The bottom of the hopper is provided at the discharge opening with a depression 36, having oppositely inclined sides and arranged to permit the lower arms to successively drop for facilitating the discharge of the severed potatoes. The knife, which is located above the depression 36, is provided at its lower face with a depending deflecting device, consisting of a lug 37, having a downwardly inclined face, arranged in the path of the lower arms and adapted to force the same downwardly. The depending lug is also arranged in the path of the portions of potatoes passing beneath the knife, and it operates to throw the potatoes downward into the seed spout 12.

The rotary carrier is provided at the top with a conical central member 38, fitting within the upwardly extending rim of the upper disk and covering the inner portions of the upper arms and adapted to cause the potatoes to roll downwardly into the annular space 18. The potatoes drop into the seed cups formed by the projecting portions of the upper and lower arms, and when the potato carrier is rotated, the projecting arms, which are located above and below the plane of the knife, carry the potatoes past the knife, causing the latter to divide the potatoes into upper and lower portions. The lower severed portions of the potatoes are dropped into the seed spout simultaneously with the cutting operation, and the upper portions of the potatoes are carried over the knife by the upper arms and are caused to drop into the respective seed cups on leaving the rear end of the knife.

The lower arms slide down to inclined faces at one side of the depression 36, and are lifted by the inclined faces at the opposite side of the depression. The bottom of the hopper is provided in advance of the depression with a plurality of curved grooves 39, adapted to receive removable plates 40 for elevating the potato as it approaches the knife to vary the size of the bottom slice or portion. By removing the plates 40 or changing the size thereof, the size of the severed portions of the potatoes may be varied. The front end of the plates 40 are provided with projections or shanks 41 for engaging sockets of the hopper, and the projecting portions of the lower arms are provided with slots 42 to permit them to pass over the potato supporting plates without being elevated by the same.

When it is desired to reduce the size of the seed cups, an inner reducing ring or sleeve 44 is placed within the hopper 1 and is arranged between the lower cylindrical portion 2 thereof and the body portion of the potato carrier. The reducing sleeve or ring, which then forms the outer wall of the seed cups, is cut away to straddle the knife and is provided with upper and lower flanges 45 and 46, the upper flange being inclined and arranged flush with the inclined intermediate portion 3 of the hopper. The lower flange, which is horizontally disposed, is arranged on the bottom of the hopper and fits against the lower cylindrical portion 2.

The upper and lower arms 16 and 17 are provided with adjustable outer sections 47 and 48, slidably connected with the upper and lower arms 16 and 17 by means of slot and bolt connections 49 and 50, but any other suitable means may be employed for adjustably mounting the outer sections on the arms 16 and 17. The adjustable outer sections are adapted to be moved inwardly to fit the reducing sleeve or ring, as clearly shown in Figs. 1 and 12 of the drawings. Instead, however, of constructing the arms with slidable outer sections, they may be made of one piece, as illustrated in Fig. 7 of the drawings.

Having thus fully described my invention, what I claim as new and desire to secure by Letters Patent, is:—

1. In a device of the class described, the combination of a hopper having a discharge opening, a rotary potato carrier operating within the hopper and provided with spaced members forming seed cups, and a knife arranged at the space between the said members in position to divide the potatoes carried by the said carrier.

2. In a device of the class described, the combination of a hopper having a cylindrical portion, a potato carrier operating in the hopper and consisting of a circular support and arranged in spaced relation with the cylindrical portion of the hopper, and projecting arms extending from the support and operating in the space between the same and the hopper, and a central conical member mounted on the carrier for directing the potatoes into the said space.

3. In a device of the class described, the combination of a hopper, a rotary potato carrier provided with radially arranged upper and lower arms spaced apart and forming seed cups, and a knife arranged in the space between the upper and lower arms and adapted to divide the potatoes carried by the seed cups.

4. In a device of the class described, the combination of a hopper having a discharge opening, a rotary carrier provided with upper and lower projecting arms forming seed cups, the lower arms being movably mounted, and means for causing the movement of the arms at the discharge opening of the hopper to drop the potatoes.

5. In a device of the class described, the combination of a hopper, a carrier provided with upper and lower arms spaced apart to form seed cups, the lower arms being movable, a knife arranged in the space between the upper and lower arms in position for dividing the potatoes carried by the seed cups, and means arranged in the path of the potatoes and the lower arms for moving the same downward to discharge the potatoes.

6. In a device of the class described, the combination of a hopper, a carrier provided with upper and lower arms spaced apart to form seed cups, the lower arms being movable, a knife arranged in the space between the upper and lower arms in position for dividing the potatoes carried by the seed cups, and means carried by and depending from the knife and arranged in the path of the lower arms and the potatoes for discharging the same from the carrier.

7. In a device of the class described, the combination of a hopper, a carrier provided with upper and lower arms spaced apart to form seed cups, the lower arms being movable, a knife arranged in the space between the upper and lower arms in position for dividing the potatoes carried by the seed cups, and a lug depending from the knife and having an inclined face arranged in the path of the lower arms and the potatoes for discharging the latter from the carrier.

8. In a device of the class described, the combination of a hopper having a discharge opening and provided at the bottom with a depression, a rotary carrier provided with upper and lower arms forming seed cups, the lower arms being movably mounted and spaced from the upper arms, a knife operating in the space between the upper and lower arms and located above the said depression, and a deflecting device arranged in the path of the potatoes and the lower arms for causing the same to move downward at the said depression.

9. In a device of the class described, the combination of a hopper provided with a discharge opening, a rotary carrier provided with spaced upper and lower arms, and a knife located above the discharge opening of the hopper and arranged in the space between the upper and lower arms in position for dividing the potatoes carried by the seed cups into upper and lower portions, said knife permitting the lower divisions of the potatoes to drop through the discharge opening and carrying the upper divisions over the discharge opening.

10. In a device of the class described, the combination of a hopper, a potato carrier provided with rigid upper arms and having lower pivotally mounted arms spaced from the upper arms, said arms being projected radially to form an annular series of seed cups, and a knife operating in the space between the arms.

11. In a device of the class described, the combination of a hopper, a potato carrier comprising a circular body portion provided with a peripheral groove, and upper and lower arms mounted on the body portion and located above and below the groove and projecting from the said body portion to form an annular series of seed cups, and a fixed knife extending into the said groove and arranged in the space between the upper and lower arms in position to divide the potatoes carried by the seed cups.

12. In a device of the class described, the combination of a hopper, a rotary carrier comprising a body portion, and upper and lower projecting arms spaced apart and forming seed cups, the lower arms being pivotally mounted, oscillatory links connected with the lower arms and with the body portion of the carrier, and a knife operating in the space between the upper and lower arms.

13. In a device of the class described, the combination of a hopper, a rotary carrier comprising a body portion having an inner depending flange and an outer depending rim, the latter being provided with slots, and arms pivoted to the inner flange and operating in the slots of the rim and extending from the body portion of the carrier for engaging the potatoes.

14. In a device of the class described, the combination of a hopper, a rotary carrier comprising a body portion having an inner depending flange and an outer depending rim, the latter being provided with slots, arms pivoted to the inner flange and operating in the slots of the rim and extending from the body portion of the carrier for engaging the potatoes, and oscillatory links connected with the arms and pivoted to the rim.

15. In a device of the class described, the combination of a hopper, a rotary carrier comprising a body portion provided with an inner depending flange having openings, said body portion being also provided with an outer rim having slots, arms operating in the slots and provided with substantially hook-shaped inner ends engaging the openings of the flange and hinged to the same, said arms being extended beyond the carrier for engaging the potatoes, and oscillatory links connected with the body portion of the carrier and with the arms.

16. In a device of the class described, the combination of a hopper, a rotary carrier comprising a circular body portion having upwardly and downwardly extending arms, the lower rim being slotted, upper arms piercing the upper rim and rigidly connected with the carrier, and lower arms pivotally connected with the carrier and operating in the slots of the lower rim, said arms being extended beyond the body portion and forming seed cups.

17. In a device of the class described, the combination of a hopper, a carrier provided with seed cups having spaced members, a fixed knife operating in the space between the members, and means located in advance of the knife for supporting the potatoes above the bottom of the hopper, said means being removable, whereby the size of the severed portions of the potatoes may be varied.

18. In a device of the class described, the combination of a hopper, a fixed knife, a potato carrier for carrying the potatoes to the knife, and means for supporting the potatoes above the bottom of the hopper to vary the size of the severed portions of the potatoes.

19. In a device of the class described, the combination of a hopper, a fixed knife, means for carrying the potatoes to the knife, and removable plates mounted on the bottom of the hopper for supporting the potatoes above the same to vary the size of the severed portions.

20. In a device of the class described, the combination of a hopper provided at its bottom with grooves, a knife mounted within the hopper, means for carrying the potatoes to the knife, and a plurality of plates removably mounted in the grooves for supporting the potatoes above the bottom of the hopper while the said potatoes are being cut.

21. In a device of the class described, the combination of a hopper, a rotary carrier having projecting radial arms forming seed cups and provided with slots, a knife arranged in the path of the potatoes, and a plurality of curved plates mounted on the bottom of the hopper for supporting the potatoes while they are being cut, said plates being disposed in line with the slots of the arms to permit the latter to clear the plates.

22. In a device of the class described, the combination of a hopper, a rotary potato carrier provided with spaced radially arranged members having adjustable sections and forming seed cups, a reducing sleeve or ring fitted within the hopper and spaced from the carrier, and a knife arranged in the space between the sleeve or ring and the rotary carrier for dividing the potatoes.

23. In a device of the class described, the combination of a hopper, a rotary potato carrier provided with radial arms forming seed cups and having adjustable outer sections movable inwardly and outwardly to vary the length of the arms, and a knife arranged in position to divide the potatoes carried by the carrier.

24. In a device of the class described, the combination of a hopper having a cylindrical lower portion and provided with an inclined intermediate portion, a reducing sleeve fitted within the hopper and provided with upper and lower flanges, the upper flanges being inclined, a rotary potato carrier operating within the hopper and provided with radial arms forming seed cups, and a knife for dividing the potatoes.

In testimony, that I claim the foregoing as my own, I have hereto affixed my signature in the presence of two witnesses.

CHARLES JENKINS.

Witnesses:
 CHARLES S. PERSONS,
 W. G. WOODWORTH.